Figure 1:
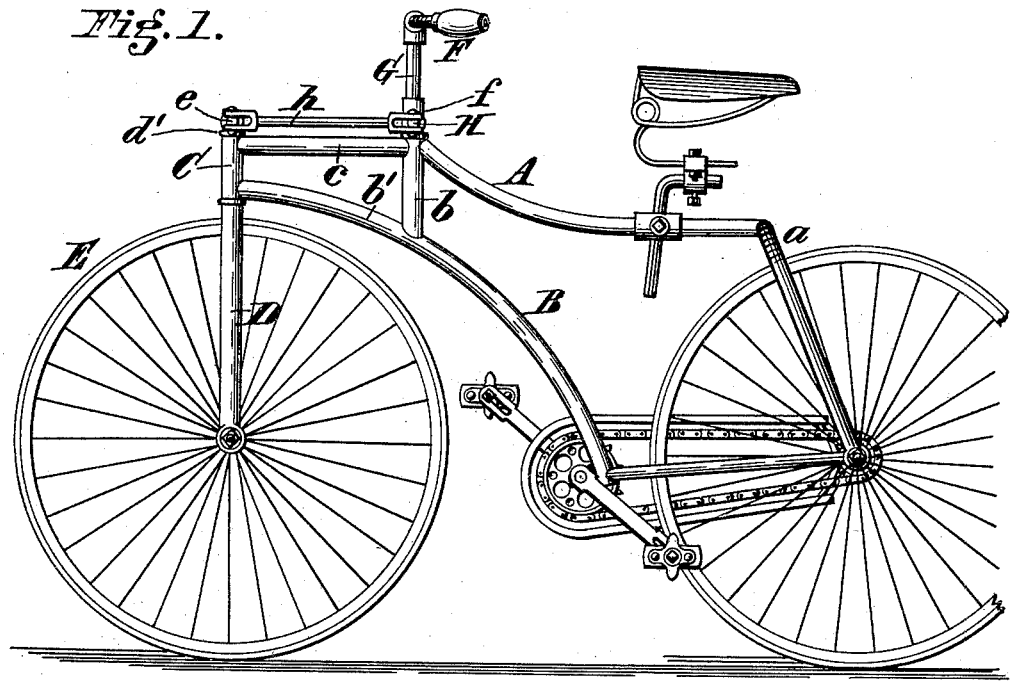

(No Model.)  2 Sheets—Sheet 1.

A. VAN BIBBER.
BICYCLE.

No. 477,583. Patented June 21, 1892.

Attest
C. B. Donaldson
Arthur Smith

Inventor
Andrew Van Bibber
by John E. Jones
his attorney (No Model.) 2 Sheets—Sheet 2.
A. VAN BIBBER.
BICYCLE.
No. 477,583. Patented June 21, 1892.
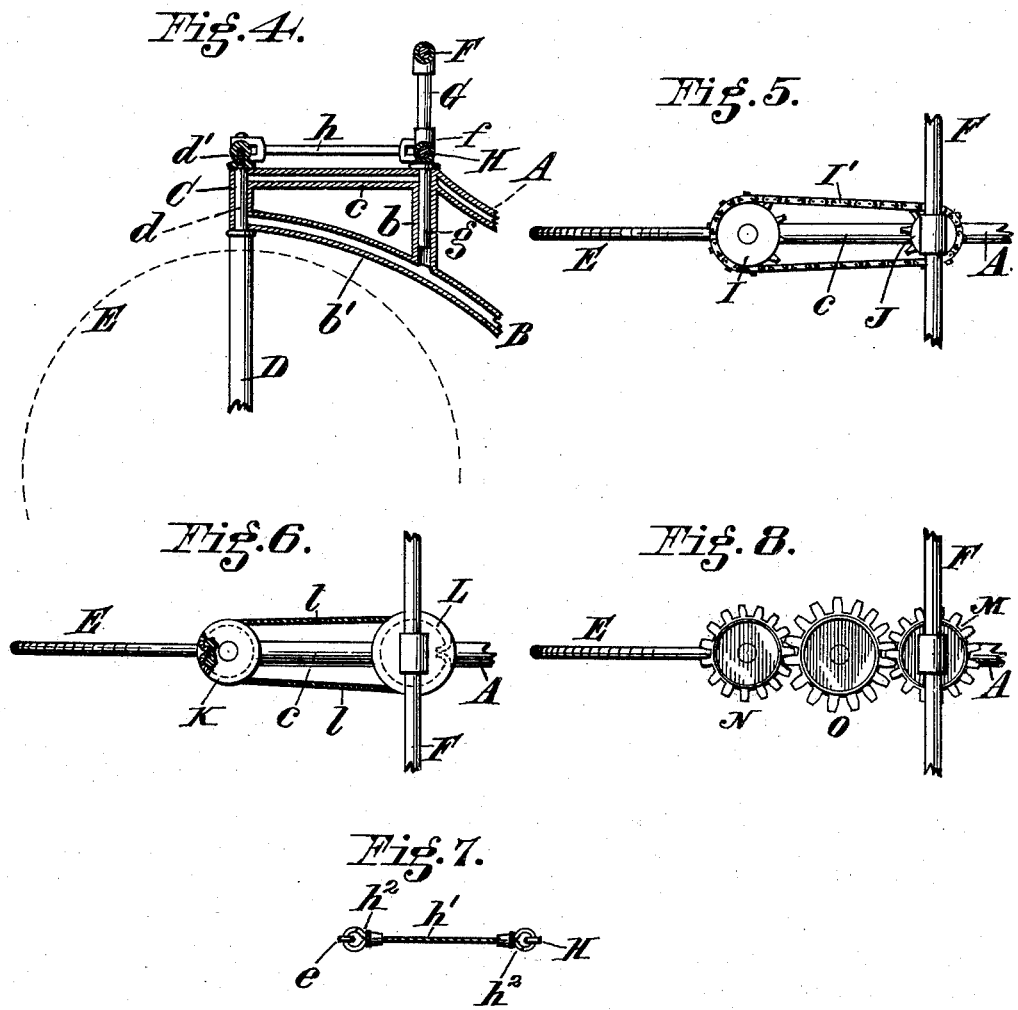

UNITED STATES PATENT OFFICE.

ANDREW VAN BIBBER, OF CINCINNATI, OHIO.

BICYCLE.

SPECIFICATION forming part of Letters Patent No. 477,583, dated June 21, 1892.

Application filed July 20, 1891. Serial No. 400,178. (No model.)

*To all whom it may concern:*

Be it known that I, ANDREW VAN BIBBER, a citizen of the United States, residing at Cincinnati, in the county of Hamilton and State of Ohio, have invented certain new and useful Improvements in Bicycles, of which the following is a specification.

My invention relates more particularly to that class of bicycle known as "Safety" bicycles, and to that part thereof designated the "steering and turning mechanism."

Hitherto all Safety or "low-down" bicycles have been made with the bearing-fork of the front or steering wheel and the upright standard carrying the handle-bar in substantially one piece, and also in substantially a single straight line, sloping backward from the front hub to the said handle-bar. In performing the steering and turning operations by means of the customary handle-bar, the front wheel thus swings or turns on a very much inclined axis, which causes it to lean or cant over quite perceptibly and inconveniently during said operations. This inclination or leaning of said wheel really renders steering and making turns quite difficult and not very effective, and especially does it make it both difficult and hazardous to cross car-tracks or rough ground. It also increases the liability of the rider to slip, slide, or fall. The fork and handle-standard, made in a single straight line, have been given this strong backward slope or inclination, because the handle-bar could thereby be made much shorter and its sweep much less than if the said fork and standard were arranged in one perpendicular line, for in the latter case the handle-bar would have to be so long and to extend backward so far to reach the rider that its sweep would be inconveniently great and therefore impractical. On account of this slope and the consequent leaning or inclination of the front wheel in making a turn or steering, the modern so-called "Safety" bicycles are obviously and notoriously more difficult to guide and turn than either the old and well-known two-wheeled bicycles of a quarter of a century ago, or the modern high-wheeled machines of to-day. To overcome these defects and at the same time arrange the handle-bar at the proper distance from the rider for manipulation, I separate the bearing-fork of the front wheel from the upright standard that carries said handle-bar, and place them in different but substantially-parallel vertical planes, the said standard being brought considerably nearer the rider than is the said bearing-fork. I then connect or couple them in such a manner that whenever the standard is turned by means of the handle-bar mounted thereon, the bearing-fork of the front wheel is simultaneously turned in the direction and to the degree desired by the rider. The connecting or coupling devices for the bearing-fork of the front wheel and the handle-bar standard, together with the arrangement and mounting of said fork and standard, will be fully described in detail hereinafter, and particularly pointed out in the claims.

Figure 2:
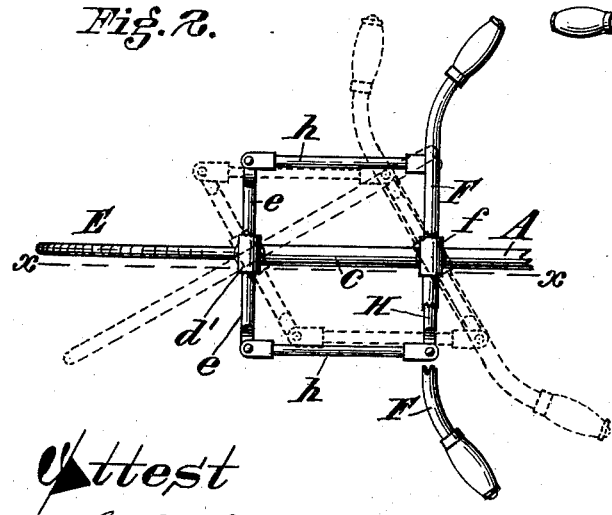
Figure 3:
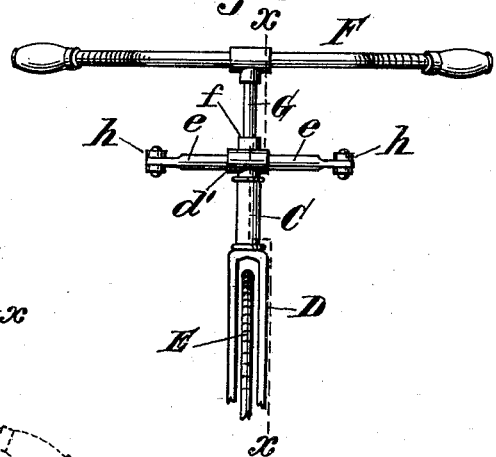

In the accompanying drawings, Figure 1 is a longitudinal elevation of a Safety bicycle embodying my invention, the rear or driving wheel being shown broken off; Fig. 2, a broken-off plan of the fore part of the machine shown in Fig. 1, the dotted lines therein showing the position the several parts of the steering-gear assume when in operation; Fig. 3, a front elevation of Fig. 2, showing the front wheel and its bearing-fork broken off at a point slightly above the bearings: Fig. 4, a longitudinal sectional elevation on lines $x\ x$, Figs. 2 and 3, the steering-wheel being shown in dotted outline; Fig. 5, a plan similar to Fig. 2, (excepting the dotted lines,) showing a modified form of transmitter connection or coupling for my front-wheel bearing-fork and handle-bar standard, the handle-bar being shown broken off; Fig. 6, a view similar to Fig. 5 of another modified form of transmitter connection or coupling; Fig. 7, a detached longitudinal elevation showing the manner in which the outer ends of the steering cross-bars for the front-wheel bearing-fork and handle-bar standard, respectively, may be connected or coupled by wire cords, instead of the rods or links shown in Fig. 1; and Fig. 8 a plan view similar to Figs. 5 and 6, showing another modified form of transmitter-coupling for the front-wheel bearing-fork and the handle-bar standard.

A represents the usual reach or perch of the bicycle-frame for supporting the rider's seat, and provided at its rear end with the hind-wheel fork $a$. B represents the usual downwardly-turned branch of the frame, having at its lower end the foot-treadle mechanism. b represents a hollow perpendicular portion of the bicycle-frame, forming a ligament between the fore end of the reach proper A and the branch B. These parts—viz., A, a, B, and b—are substantially the same as in all machines of this class, excepting that the ligament b is perpendicular, instead of being inclined or sloped backwardly, as in Safety bicycles heretofore made and hereinbefore mentioned.

c represents a horizontal extension of the reach A, leading from the upper end of ligament b forward, and b' is a continuation of the branch B forward of the lower end of said ligament, as clearly shown in Fig. 1.

C is a perpendicular hollow ligament connecting the fore ends of the extensions c and b'.

The parts C c b' practically form an extension-frame on the fore end of the bicycle-frame heretofore in use, excepting that the ligament b is perpendicular instead of inclined, as before stated.

D represents a perpendicular forked bar having at its upper end a vertical axis or tang d, bearing in the perpendicular hollow ligament C of the extension-frame, as clearly shown in the sectional view, Fig. 4.

E represents the front or steering wheel, revolving, as customary, on bearings in the lower ends of fork D. The upper end of the tang or axis d of fork D projects beyond the top of ligament C and is capped with a T-head d', as most clearly shown in Figs. 3 and 4.

e e are laterally-projecting arms, of equal length, at either side said T-head d', and together forming a transverse cross-bar or tiller surmounting said front-wheel fork D.

F represents the usual handle-bar, surmounting at its center a perpendicular standard G, whose lower end is socketed in a head f.

g is a perpendicular tang projecting downwardly from the bottom of standard socket-head f into the hollow ligament b of the frame, and thereby forming a perpendicular axis therein for the handle-bar standard, as clearly shown in Fig. 4.

H H represent laterally-projecting arms, of equal length, at either side said standard socket-head f, and together forming a transverse cross-bar or tiller on the handle-bar standard parallel with and on the same horizontal plane as the arms e e, comprising the cross-bar on the top of the front-wheel fork.

h h are horizontal parallel rods or links connecting the ends of arms or bars e e with those of the arms H H and forming the transmitter-coupling between the perpendicular handle-bar standard and the perpendicular fork of the front wheel.

In the operation of my steering and turning gear it is quite clear that the simple movement of the handle-bar in either direction on its perpendicular axis or standard will be communicated or transmitted to the front-wheel bearing-fork by means of the cross-bars H H on said standard, the connecting rods or links h h, and the cross-bars e e on the upper end of the perpendicular axis of the bearing-fork of the front wheel. The bearings in the ligaments or hollow frame-bars b and C being alike perpendicular with the handle-standard and fore-wheel fork, said standard bringing the handle-bar at the proper distance from the rider, and said fork independent and some distance forward of said standard and also in a perpendicular line with the central or bearing axis of the fore wheel, a steering and turning gear is provided that operates with freedom and accuracy, and no inclination or canting of the fore wheel, with its deleterious and hazardous effects, are possible.

In Figs. 1, 2, and 3 I have shown the cross-bars on both the handle-bar standard and the fork of the front wheel of equal length, their transmitter connecting-rods h h being stiff or rigid ones. These rods h are forked or bifurcated at their opposite ends to span or engage the respective flattened ends of the said cross-bars, which construction obviously facilitates their operation. Fig. 2 shows in dotted lines just how this construction of transmitter coupling operates the cross-bar on the fore-wheel fork moving in arcs of the same degrees as those of the cross-bar on the handle-bar standard, which is one of the many forms of coupling the said standard and fork for mutual operation.

It is obvious that instead of making the cross-bar on the standard the same length as that on the fore-wheel fork it could be made longer than that on said fork, or vice versa, so that the standard cross-bar would move in fewer degrees of a circle than the fork cross-bar on the one hand and in a greater number of degrees of a circle than said fork cross-bar on the other.

Instead of connecting the outer ends of the respective cross-bars H and e by means of the stiff rods or links h, they could be connected or coupled by means of wire cords or ropes h', as shown in Fig. 7, and a like result ensue. For convenience, the opposite ends of the wire cords are provided with ordinary spring loops or catches $h^2$, enabling them to be attached or detached at pleasure.

The form of coupling shown in Fig. 5 has sprocket-wheels I and J, mounted on the fore-wheel fork and standard, instead of the cross-bars H and e, respectively, and a drive-chain I' runs over said wheels to form the transmitter coupling, instead of the connecting rods or links h. This form of coupling is certainly a very practical and good one, as the operations or movements thereof are especially free and easy and also positive. Different-sized wheels or the same size, or both, may be used, as desired, and in the same manner, as before stated, in reference to the rods and cross-bars.

The form of coupling shown in Fig. 6 is almost the same as that shown in Fig. 5, except that the wheels K and L are grooved on their faces instead of toothed and the transmitter coupling used is a pair of wire cords *l l*, clinched at their opposite ends in the grooves of said wheels. These wheels may be of the same size on both the standard and said fork, or vary in size, as desired, and clearly obvious.

The form of coupling shown in Fig. 8 is also almost the same as that shown in Fig. 6, except that the wheels M and N are ordinary spur-gears instead of sprocket-wheels, and instead of using a drive-chain an idler spur-gear O is mounted on the extension-frame bar *c*, intermediate said gears M and N, and communicates the proper motion from the standard-gear M to the gear N on the fore-wheel fork. It is also obvious that these gears could vary or be constant throughout in size, as desired.

In the arrangement and operation of these devices it is clear that by making the handle-bar move through more degrees of a circle than does the fore-wheel fork, (or, in other words, the cross-bar or wheel of the handle-bar standard is smaller than that on said fork, as in the modification, Fig. 5,) greater steadiness and accuracy of steering results, and much better and finer control of the movements of the front wheel is given. On the contrary, if the coupling between the handle-bar and said fork is such that said handle-bar moves through less degrees of a circle than does said fork, (or, in other words, the cross-bar or wheel of the handle-bar standard is larger than that on said fork, as in the modification, Fig. 6,) then ordinary steering becomes somewhat more difficult and requires greater steadiness of hand, while sharp turns and trick riding are rendered much easier to an expert rider, as they require but a very slight movement of the hands.

I claim—

1. In a Safety bicycle, the combination, with a skeleton frame, composed of the reach A, rear fork *a*, branch B, and perpendicular hollow ligament *b*, of a fore extension-frame, formed integral with and of the same tubing as said skeleton frame and composed of the horizontal reach extension *c*, branch extension *b'*, and perpendicular hollow ligament C, said perpendicular hollow ligament *b* forming a bearing for the perpendicular handle-bar standard, and said perpendicular hollow ligament C forming a bearing for the perpendicular axis of a perpendicular bearing-fork for the fore wheel, substantially as and for the purpose specified.

2. In a Safety bicycle, the combination of the skeleton frame A *a* B *b*, having the fore extension-frame C *c b'* formed integral therewith and of the same tubing as said skeleton frame, the parts *b* and C in said skeleton frame and extension-frame, respectively, being hollow and perpendicular, fore wheel E, perpendicular bearing - fork D, supporting said fore wheel and having a perpendicular axis or bearing in said perpendicular hollow ligament C, handle-bar and its perpendicular standard F G, mounted perpendicularly in said perpendicular hollow ligament *b*, and a transmitter coupling device for said perpendicular fork and standard, composed of the transverse bars *e* and H and connecting rods or links *h*, or their described equivalents, substantially as and for the purpose specified.

ANDREW VAN BIBBER.

Witnesses:
JOHN E. JONES,
C. B. DONALDSON.